(12) United States Patent
Wang et al.

(10) Patent No.: US 9,342,668 B2
(45) Date of Patent: May 17, 2016

(54) SIGNALING AND HANDLING CONTENT ENCRYPTION AND RIGHTS MANAGEMENT IN CONTENT TRANSPORT AND DELIVERY

(71) Applicant: Futurewei Technologies, Inc., Plano, TX (US)

(72) Inventors: Xin Wang, Rancho Palos Verdes, CA (US); Shaobo Zhang, Shenzhen (CN); Alexander Giladi, Princeton, NJ (US); Yongliang Liu, Beijing (CN)

(73) Assignee: Futurewei Technologies, Inc., Plano, TX (US)

( * ) Notice: Subject to any disclaimer, the term of this patent is extended or adjusted under 35 U.S.C. 154(b) by 1 day.

(21) Appl. No.: 13/941,408

(22) Filed: Jul. 12, 2013

(65) Prior Publication Data

US 2014/0020111 A1 Jan. 16, 2014

Related U.S. Application Data

(60) Provisional application No. 61/671,261, filed on Jul. 13, 2012.

(51) Int. Cl.
*G06F 21/10* (2013.01)
*H04L 29/06* (2006.01)
*H04N 21/2362* (2011.01)
(Continued)

(52) U.S. Cl.
CPC ............ *G06F 21/10* (2013.01); *H04L 63/0428* (2013.01); *H04L 63/205* (2013.01); *H04L 65/4084* (2013.01); *H04L 65/605* (2013.01); *H04L 65/607* (2013.01); *H04N 21/2362* (2013.01); *H04N 21/2541* (2013.01); *H04N 21/26613* (2013.01); *H04N 21/4627* (2013.01)

(58) Field of Classification Search
None
See application file for complete search history.

(56) References Cited

U.S. PATENT DOCUMENTS

| 2003/0009669 | A1* | 1/2003 | White | H04N 1/32272 713/176 |
| 2005/0091576 | A1  | 4/2005 | Relyea et al. | |

(Continued)

FOREIGN PATENT DOCUMENTS

| KR | 101031700 B1 | 4/2011 |
| WO | 0131497 A1 | 5/2001 |
| WO | 2010025686 A1 | 3/2010 |

OTHER PUBLICATIONS

Foreign Communication From A Counterpart Application, PCT Application No. PCT/US2013/050397, International Search Report dated Oct. 9, 2013, 4 pages.

(Continued)

*Primary Examiner* — David Pearson
(74) *Attorney, Agent, or Firm* — Conley Rose, P.C.; Grant Rodolph; Brandt D. Howell

(57) ABSTRACT

An apparatus comprising a memory, a processor coupled to the memory and configured to obtain a protection description for media content comprising a plurality of content items, wherein the protection description comprises data signaling at least two protection mechanisms for at least two content items in a media content, wherein each of the at least two content items is protected by one or more of the at least two protection mechanisms, and wherein the protection mechanisms for the at least two content items are different, determine the protection mechanisms for the at least two content items from the data, and process the at least two content items according to their associated protection mechanisms.

11 Claims, 4 Drawing Sheets

(51) Int. Cl.
  *H04N 21/254* (2011.01)
  *H04N 21/266* (2011.01)
  *H04N 21/4627* (2011.01)

(56) References Cited

U.S. PATENT DOCUMENTS

| | | | |
|---|---|---|---|
| 2006/0090082 A1* | 4/2006 | Apostolopoulos | 713/189 |
| 2007/0101412 A1* | 5/2007 | Yang et al. | 726/5 |
| 2007/0208668 A1* | 9/2007 | Candelore | 705/57 |
| 2010/0185854 A1* | 7/2010 | Burns et al. | 713/165 |
| 2011/0219098 A1* | 9/2011 | Xu | H04N 21/85406 709/219 |
| 2011/0225417 A1 | 9/2011 | Maharajh et al. | |
| 2012/0017282 A1* | 1/2012 | Kang et al. | 726/26 |
| 2012/0128333 A1 | 5/2012 | Miyake et al. | |
| 2013/0042100 A1* | 2/2013 | Bouazizi et al. | 713/151 |
| 2013/0311776 A1* | 11/2013 | Besehanic | 713/168 |
| 2015/0180873 A1* | 6/2015 | Mooij | H04N 21/2585 726/4 |

OTHER PUBLICATIONS

Foreign Communication From A Counterpart Application, PCT Application No. PCT/US2013/050397, Written Opinion dated Oct. 9, 2013, 5 pages.

Giladi, A., "ISO/IEC FDIS 23009-4," International Organisation for Standardisation Organisation Internationale De Normalisation, ISO/IEC JTC1/SC29/WG11, Coding of Moving Pictures and Audio, Geneva, Switzerland, Jan. 2013, 34 pages.

"Information Technology—Dynamic Adaptive Streaming over HTTP (DASH)—Part 1: Media Presentation Description and Segment Formats," ISO/IEC JTC11/SC29/WG11, ISO/IEC 23009-1:2012(E), Jan. 5, 2012, 136 pages.

"Information Technology—High Efficiency Coding and Media Delivery in Heterogeneous Environments—Part 1: MPEG Media Transport (MMT)," ISO/IEC JTC 1/SC29/WG11, ISO/IEC DIS 23008-1, Apr. 26, 2013, 92 pages.

"Information Technology—High efficiency coding and media delivery in heterogeneous environments—Part 1: MPEG media transport (MMT)," ISO/IEC JTC 1/SC 29, ISO/IEC DIS 23008-1, Apr. 26, 2013, 92 pages.

"G26 RS Referencing Explanatory Report (RER) Template," SC29/WG 11, May 11, 2012, 3 pages.

"Information technology—Dynamic adaptive streaming over HTTP (DASH)—Part 4: Segment encryption and authentication," International Standard, ISO/IEC 23009-4, Jul. 1, 2013, 32 pages.

"Information technology—Dynamic adaptive streaming over HTTP (DASH)—Part 1: Media presentation description and segment formats," International Standard, ISO/IEC 23009-1, Apr. 1, 2012, 134 pages.

"Information Technolog—MPEG systems technologies—Part 7: Common encryption in ISO base media file format files," ISO/IEC JTC1/SC 29, ISO/IEC FDIS 23001-7:2011(E), Jul. 22, 2011, 15 pages.

Foreign Communication From a Counterpart Application, European Application No. 13742106.1, Extended European Search Report dated Nov. 4, 2015, 6 pages.

Foreign Communication From A Counterpart Application, Korean Application No. 10-2015-7003381, Korean Notice of Allowance dated Mar. 16, 2016, 4 pages.

* cited by examiner

SIGNALING AND HANDLING CONTENT ENCRYPTION AND RIGHTS MANAGEMENT IN CONTENT TRANSPORT AND DELIVERY

CROSS-REFERENCE TO RELATED APPLICATIONS

The present application claims priority to U.S. Provisional Patent Application No. 61/671,261, filed Jul. 13, 2012 by Xin Wang, et al., titled "System and Method for Signaling and Handling Content Encryption and Rights Management in Content Transport and Delivery," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A media content provider or distributor may deliver various media contents to subscribers or users using different encryption and/or coding schemes suited for different devices, e.g., televisions, notebook computers, and mobile handsets. The media content provider may support a plurality of media encoder and/or decoders (codecs), media players, video frame rates, spatial resolutions, bit-rates, video formats, or combinations thereof. A piece of media content may be converted from a source or original representation to various other representations to suit the different user devices.

SUMMARY

In one embodiment, the disclosure includes an apparatus comprising a memory, a processor coupled to the memory and configured to obtain a protection description for media content comprising a plurality of content items, wherein the protection description comprises data signaling at least two protection mechanisms for at least two content items in a media content, wherein each of the at least two content items is protected by one or more of the at least two protection mechanisms, and wherein the protection mechanisms for the at least two content items are different, determine the protection mechanisms for the at least two content items from the data, and process the at least two content items according to their associated protection mechanisms.

In another embodiment, the disclosure includes a computer program product comprising computer executable instructions stored on a non-transitory computer readable medium such that when executed by a processor cause a network element (NE) to obtain a protection description for media content, wherein the media content comprises a plurality of encrypted content items, and wherein the protection description comprises data signaling at least two protection mechanisms for at least two encrypted content items described in a media description, where each of the at least two encrypted content items is associated with one or more of the at least two protection mechanisms, and wherein the protection mechanisms for the at least two encrypted content items are different, determine the associated protection mechanisms from the data for the at least two encrypted content items, and process the at least two encrypted content items according to their associated protection mechanisms.

In yet another embodiment, the disclosure includes a method comprising obtaining a media content comprising at least two content items, wherein each of the at least two content items are protected by one or more of at least two protection mechanisms, and wherein the protection mechanisms for each of the at least two content items is different, developing a protection description for the media content, wherein the protection description comprises data sufficient to signal the protection mechanisms for the at least two content items, and transmitting the protection description to a client.

In still another embodiment, the disclosure includes an apparatus comprising a memory, a processor coupled to the memory and configured to obtain a media content comprising at least two content items, wherein each of the at least two content items are protected by one or more of at least two protection mechanisms, and wherein the protection mechanisms for each of the at least two content items is different, develop a protection description for the media content, wherein the protection description comprises data sufficient to signal the protection mechanisms for the at least two content items, and transmit the protection description and the media content to a client.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
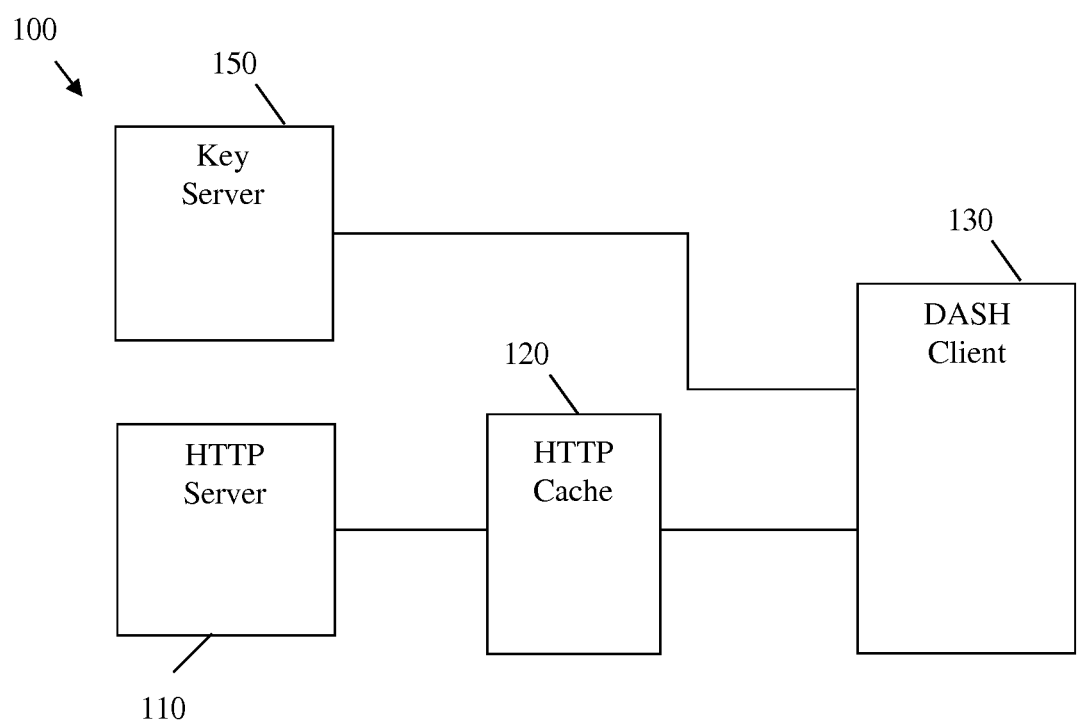
FIG. 1 is a schematic diagram of an embodiment of a Dynamic Adaptive Streaming over Hypertext Transfer Protocol (HTTP) (DASH) enabled network architecture.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In adaptive streaming, the user device may select appropriate segments dynamically when delivering media content to a user device based on a variety of factors, such as network conditions, device capability, and user choice. Adaptive streaming may include various technologies or standards implemented or being developed, such as DASH, HTTP Live Streaming (HLS), or Internet Information Services (IIS) Smooth Streaming. When employing DASH, a media content provider may, upon request, transmit an media presentation description (MPD) file to the client. The MPD file may be an extensible markup language (XML) document and may describe the media content as segments and may describe how such segments may be utilized to present the media content to a user. For example, the MPD file may describe segment timing, segment multiplexing (e.g., interrelation between audio segment and video segment timings), and/or Uniform Resource Locator (URL) information indicating where such segments may be obtained. For example, streamed media content may comprise several media components (e.g., audio, video, and text), each having different characteristics specified in the MPD.

To prevent tampering, attacks, and/or unauthorized access to media content, segments of the media content may need to be protected via authentication schemes, herein referred to as encryption or encoding schemes. For content encryption, Moving Picture Experts Group (MPEG) has developed certain frameworks, e.g., the frameworks recounted in Organization for Standardization/International Electrotechnical Commission (ISO/IEC) documents numbered 23001-7, titled "MPEG systems technologies—Part 7: Common encryption in ISO base media file format files," and 23009-4, titled "Dynamic Adaptive Streaming over HTTP (DASH)—Part 4: Segment Encryption and Authentication" (ISO/IEC 23009-4) (referred to herein as "Part 4"), incorporated herein by reference. Conventional approaches to encoding MPEG streams have generally relied on a single algorithm approach for stream encoding. However, such approaches may not allow content from different sources to be merged into a single MPEG stream, e.g., entertainment content from a first source and commercials from a second source.

Disclosed herein are embodiments utilizing signaling fields in MPD files to indicate the encryption scheme which applies to the stream subsequent to the MPD. This may allow protected and non-protected content to be handled, e.g., encrypted, rights regulated, specially processed, etc., in adaptive and efficient ways. Further, the disclosed embodiments may allow content to be handled via signaling, e.g., without retrieving and examining content components themselves. Thus, the disclosed embodiments may permit encryption metadata, keys, licenses, required systems, etc., to be obtained in order to enable a client to make a selection and perform dynamic adaptations without retrieving and examining content components themselves. The disclosed methods may relieve digital broadcasters from having to push encryption and rights information along with the content, thereby enabling on-demand content and live-event streaming incorporating various encryption schemes.

Figure 2:
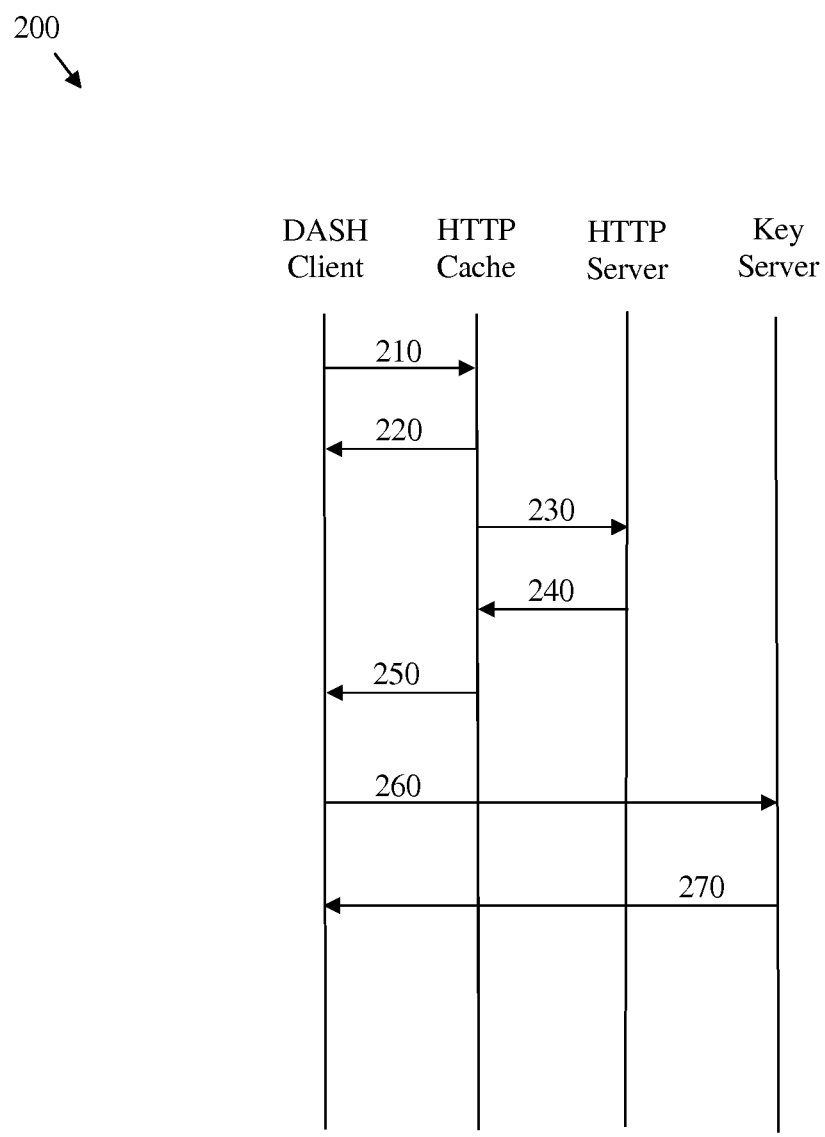
FIG. 2 is a protocol diagram of an embodiment of a DASH communication method.

FIG. 1 is a schematic diagram of an embodiment of a DASH enabled network 100 architecture that communicates according to the protocol diagram of FIG. 2. Network 100 may comprise an HTTP server 110, a key server 150, an HTTP cache 120, and a DASH client 130 arranged as shown in FIG. 1. HTTP server 110 may be any device configured to service HTTP requests from DASH client 130. Key server 150 may be any device configured to service key and/or initialization vector (IV) requests from DASH client 130. In alternate license-based embodiments, key server 150 may be replaced with a license server, as would be understood by those of skill in the art. HTTP server 110 and key server 150 may be located on the same device, on different devices, or spread amongst a cluster of devices. For example, HTTP server 110 and/or key server 150 may comprise dedicated servers positioned in a data center. As another example, HTTP server 110 and/or key server 150 may operate as virtual machines (VMs) in a cloud computing environment. The HTTP server 110 may also be part of a content provider network or may be a node in a content distribution network (CDN). HTTP server 110 may populate an MPD file with information indicting URLs and/or a URL scheme, which may allow DASH client 130 to locate segment data. HTTP server 110 may further populate the MPD file with information indicting URLs and/or a URL scheme, which may allow DASH client 130 to locate the associated keys and/or IVs at the key server 150. HTTP server 110 may further populate the MPD file with any information DASH client 130 may require in order to present the data, such as period information, timing, segment format information, multiplexing information, etc. HTTP server 110 may then transmit the MPD file to DASH client 130 upon request. HTTP server 110 may also transmit segments and/or message authentication codes (MACs) to DASH client 130 upon request.

HTTP cache 120 may be any device configured to temporarily store information for rapid access by DASH client 130. For example, HTTP cache 120 may be a browser cache, which may be a software based cache stored on DASH client 130, a proxy cache, which may be a shared cache on DASH client 130's network, a gateway cache, which may be a shared cache installed in the same network as key server 150 and/or HTTP server 110, or combinations thereof. HTTP cache 120 may store segment data, MPD files, MACs and/or any other data DASH client 130 may require to present the media content.

DASH client 130 may be any device configured to obtain media content via a DASH protocol and present such media content to a user, such as a mobile phone, personal computer (PC), Internet Protocol (IP) television (TV), IP TV set top box, laptop PC, internet radio device, tablet PC, media storage device, etc. The DASH client 130 may present the content via a web browser, a media player, a video presenter, or any other program suitable for video and/or audio playback. The DASH client 130 may directly present the media content (e.g. visual data via a screen, audio data via a speaker, etc.) and/or may save and/or transmit the media content to other device(s) for presentation. The DASH client 130 may request an MPD file, for example via an HTTP GET request. The DASH client 130 may then review the MPD file to determine URLs for keys, IVs, MACs, ciphers, segments, etc. The DASH client 130 may also obtain any keys, IVs, MACs, ciphers, segments, etc., needed to display the media content, for example via an HTTP GET request(s) to the key server 150 and/or HTTP server 110. Upon receiving the necessary information, the DASH client 130, may decrypt the segment(s) with the cipher(s), key(s), and/or IVs, authenticate the segments(s) with the MAC, select and/or multiplex the segment data as directed by the MPD, and present the media content to the user and/or transmit the media content to another device for storage and/or presentation to the user. It should be noted that while only one DASH client 130 is shown for purposes of clarity, there may be many DASH clients 130 that may request the same and/or different media presentations from an HTTP server 110 at any specified time.

FIG. 2 is a protocol diagram of an embodiment of DASH communication method 200. At step 210, DASH client 130 may request data from an HTTP server 110 via an HTTP cache 120. The data may comprise an MPD, media content segments, or any other DASH associated data. Upon receiving requests from DASH client 130, the HTTP cache 120 may determine whether the requested data is already stored in the HTTP cache 120. If the data is stored, at step 220 the HTTP cache 120 may respond to the DASH client 130 request without forwarding the request to server 110. If the requested data is not stored in the HTTP cache 120, at step 230 the HTTP cache 120 may forward the request to HTTP server 110. At step 240, the HTTP server 110 may respond by transmitting the requested data to the HTTP cache 120. The HTTP cache 120 may forward the response to the requesting DASH client 130 at step 250, and/or save any data from the response for faster access at a later use by the same or a different DASH client 130. Based on data received from the HTTP cache 120, at step 260, DASH client 130 may request associated keys and/or IVs from the key server 150. At step 270, upon receiving the required components from key server 150, DASH client 130 may decrypt media content segments, arrange the media content contained in the segments according to an MPD, and present the media content to the user.

Figure 3:
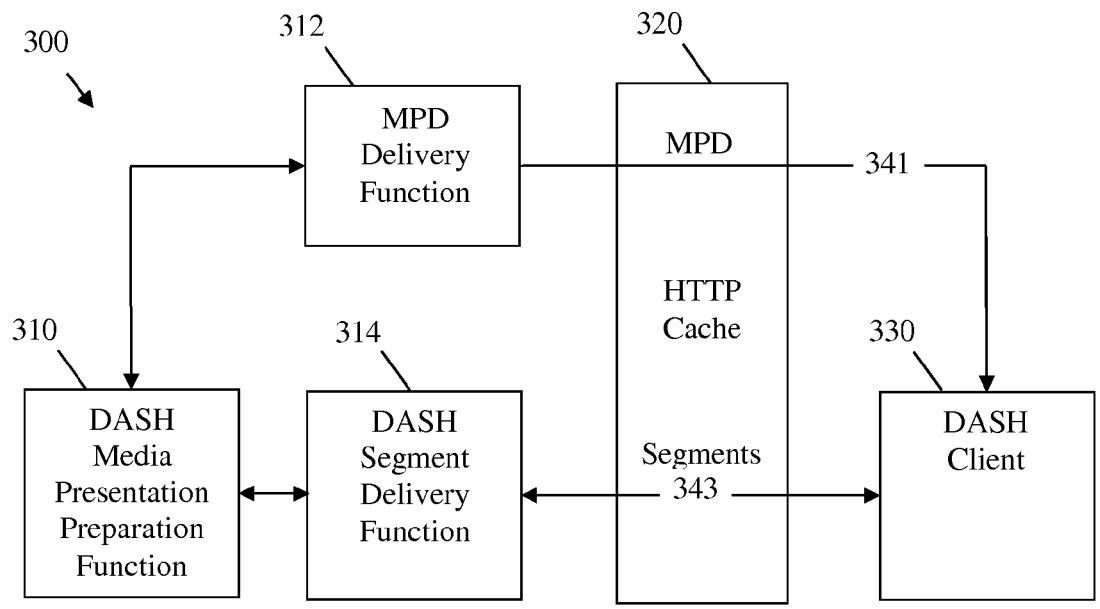
FIG. 3 is a schematic diagram of an embodiment of a DASH delivery process model.

FIG. 3 is a schematic diagram of an embodiment of a DASH delivery process model 300. Model 300 may comprise a DASH media presentation preparation function 310, which may be implemented on a HTTP server, such as HTTP server 110, a content provider server, etc. Model 300 may further comprise an MPD delivery function 312 and a DASH segment delivery function 314, which may be implemented on a HTTP server such as HTTP server 110. Model 300 may further comprise a HTTP cache 320 and a DASH client 330, which may be substantially similar to HTTP cache 120 and DASH client 130, respectively. DASH media presentation preparation function 310, MPD delivery function 312, and DASH segment delivery function 314 may operate to transmit an MPD 341 and associated segments 343 to DASH client 330 via HTTP cache 320.

DASH media presentation preparation function 310 may be configured to prepare a media presentation for viewing by a DASH client 330. For example, the DASH media presentation preparation function 310 may receive data regarding media content from a CDN and may prepare an MPD to describe the media content. The MPD may list URLs for keys, IVs, ciphers, segments, and/or MACs. The MPD may list such URLs as static addresses and/or as functions that may be used to determine associated URLs. The MPD may be created using XML. An MPD may comprise information for one or more periods. Each period may comprise one or more adaptation sets. Each adaptation set may comprise one or more representations. Each representation may comprise one or more segments. A period may comprise timing data and may represent a content period during which a consistent set of encoded versions of the media content is available (e.g. a set of available bitrates, languages, captions, subtitles etc. that do not change). An adaptation set may represent a set of interchangeable encoded versions of one or several media content components. For example, a first adaptation set may comprise a main video component, a second adaptation set may comprise a main audio component, a third adaptation set may comprise captions, etc. An adaptation set may also comprise multiplexed content, such as combined video and audio. A representation may describe a deliverable encoded version of one or more media content components, such as an ISO base media file format (ISO-BMFF) version, a Moving Picture Experts Group (MPEG) version two transport system (MPEG-2 TS) version, etc. A representation may describe, for example, any needed codecs, encryption, and/or other data needed to present the media content. A DASH client 330 may dynamically switch between representations based on network conditions, device capability, user choice, etc., which may be referred to as adaptive streaming. Each segment may comprise the media content data, may be associated with a URL, and may be retrieved by the DASH client 330, e.g. with an HTTP GET request. Each segment may contain a pre-defined byte size (e.g., 1,000 bytes) and/or an interval of playback time (e.g., 2 or 5 seconds) of the media content. A segment may comprise the minimal individually addressable units of data that can be downloaded using URLs advertised via the MPD. The periods, adaptation sets, representations, and/or segments may be described in terms of attributes and elements, which may be modified to affect the presentation of the media content by the DASH client 330.

Upon preparing the MPD, the DASH media presentation preparation function 310 may deliver the MPD to the MPD delivery function 312.

The DASH client 330 may request the MPD 341 be delivered by the MPD delivery function 312. The MPD delivery function 312 may respond with the MPD 341 via the HTTP cache 320. Based on the address data in the MPD, the DASH client 330 may request appropriate segments 343 from the DASH segment delivery function 314. It should be noted that segments 343 may be retrieved from a plurality of DASH segment delivery functions 314 and/or from a plurality of URLs and/or physical locations. The DASH client 330 may present the retrieved segments 343 based on the instructions in the MPD 341.

Figure 4:
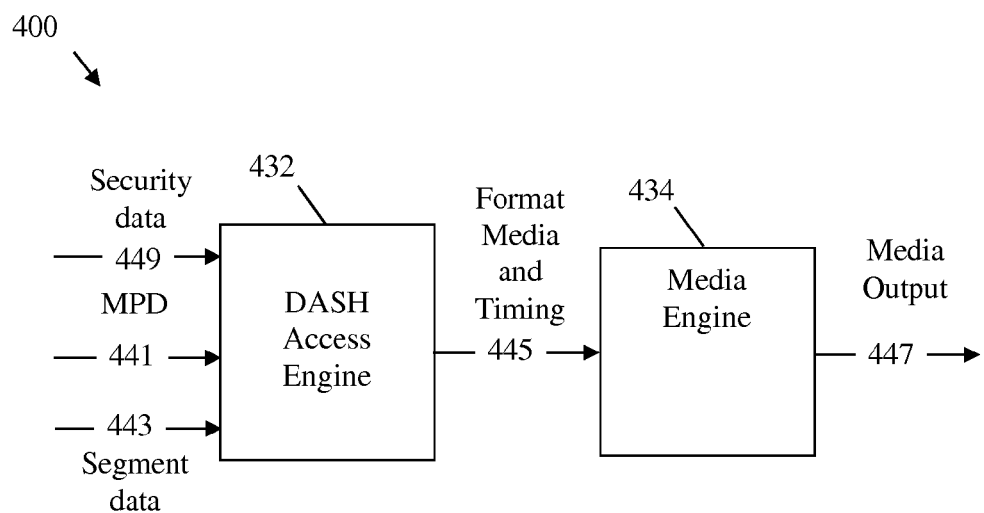
FIG. 4 is a schematic diagram of an embodiment of a DASH client process model.

FIG. 4 is a schematic diagram of an embodiment of a DASH client process model 400. Model 400 may comprise a DASH access engine 432 and a media engine 434, which may be implemented in a DASH client, such as DASH clients 130 and/or 330. DASH access engine 432 may be any component configured to interpret an MPD, request media data, and receive such data. For example, DASH access engine 432 may request an MPD 441, such as MPD 341, from an MPD delivery function, such as MPD delivery function 312. Based on the MPD 441, DASH access engine 432 may also request segment data 443 from a DASH segment delivery function, such as DASH segment delivery function 314. Also based on the MPD 441, the DASH access engine 432 may request any security data 449, such as MACs from an HTTP server to authenticate the segment data 443 and/or ciphers, IVs, and/or keys from a key server such as key server 150 to decrypt the segment data 443. Once the segment data 443 has been decrypted and authenticated, the DASH access engine 432 may forward the format, media, and/or timing 445 to the media engine 434. The media engine 434 may be any component configured to receive the format, media, and/or timing 445 and prepare media output 447 based on the format, media, and/or timing 445. The media output 447 may be stored and/or transmitted to a component for presentation to a user (e.g. a screen, speaker, etc.)

Figure 5:
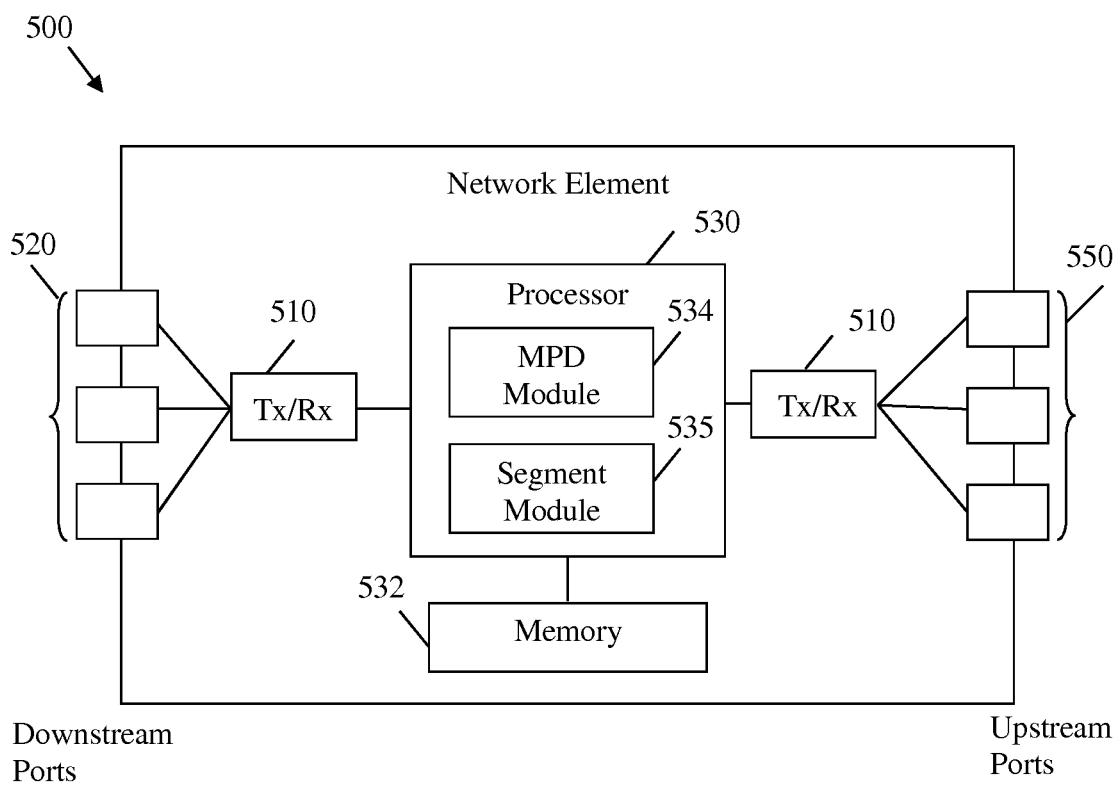
FIG. 5 is a schematic diagram of an embodiment of a NE.

FIG. 5 is a schematic diagram of an embodiment of a NE 500 which may act as a DASH server, such as HTTP server 110, a key server 150, a DASH media presentation preparation function 310, an MPD delivery function 312, and/or a DASH segment delivery function 314, within a network and/or model such as network 100 and/or model 300, and may be configured to generate MPDs and/or transmit segments to a DASH client such as DASH client 130, and/or 330. NE 500 may be implemented in a single node or the functionality of NE 500 may be implemented in a plurality of nodes in a CDN, or other content based network. In some embodiments NE 500 may also act as other node(s) in network 100 and/or model 300. One skilled in the art will recognize that the term NE encompasses a broad range of devices of which NE 500 is merely an example. NE 500 is included for purposes of clarity of discussion, but is in no way meant to limit the application of the present disclosure to a particular NE embodiment or class of NE embodiments. At least some of the features/methods described in the disclosure may be implemented in a network apparatus or component such as an NE 500. For instance, the features/methods in the disclosure may be implemented using hardware, firmware, and/or software installed to run on hardware. The NE 500 may be any device that transports frames through a network, e.g., a switch, router, bridge, server, a client, etc. As shown in FIG. 5, the NE 500 may comprise transceivers (Tx/Rx) 510, which may be transmitters, receivers, or combinations thereof. A Tx/Rx 510 may be coupled to a plurality of downstream ports 520 (e.g. downstream interfaces) for transmitting and/or receiving frames from other nodes and a Tx/Rx 510 coupled to plurality of upstream ports 550 (e.g. upstream interfaces) for transmitting and/or receiving frames from other nodes, respectively. A processor 530 may be coupled to the Tx/Rxs 510 to process the frames and/or determine which nodes to send frames to. The processor 530 may comprise one or more multi-core processors and/or memory devices 532, which may function as data stores, buffers, etc. Processor 530 may be implemented as a general processor or may be part of one or more application specific integrated circuits (ASICs) and/or digital signal processors (DSPs). Processor 530 may comprise an MPD module 534 and/or a segment module 535. The MPD module 534 may prepare an MPD and/or forward the MPD toward a client upon request. The segment module 535 may forward segments toward the client upon request. In an alternative embodiment, the MPD module 534 and/or a segment module 535 may be implemented as instructions stored in memory 532, which may be executed by processor 530. In another alternative embodiment, the MPD module 534 and the segment module 535 may be implemented on separate NEs. The downstream ports 520 and/or upstream ports 550 may contain electrical and/or optical transmitting and/or receiving components.

It is understood that by programming and/or loading executable instructions onto the NE 500, at least one of the processor 530, MPD module 534, segment module 535, downstream ports 520, Tx/Rxs 510, memory 532, and/or upstream ports 550 are changed, transforming the NE 500 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The MPD may contain certain common attribute and elements, as described in ISO/IEC 23009-1, titled "Dynamic Adaptive Streaming over HTTP (DASH)—Part 1: Media presentation description and segment formats," (referred to herein as "Part 1") incorporated herein by reference. One such element is the ContentProtection element, which may specify information about content protection schemes used for the associated Representations. The MPD may also contain descriptors that provide a flexible mechanism for DASH content authors to annotate and extend the MPD, Period, AdaptationSet and Representation elements. The semantics of the attributes within an element of the type DescriptorType are described in Part 1 using the following syntax and semantics:

TABLE 1

| Element or Attribute Name | Use | Description |
|---|---|---|
| DescriptorType | | |
| @schemeIdUri | M | specifies a uniform resource identifier (URI) to identify the scheme. The semantics of this element are specific to the scheme specified by this attribute. The @schemeIdUri may be a uniform resource name (URN) or URL. When a URL is used, it should also contain a month-date in the form mmyyyy; the assignment of the URL must have been authorized by the owner of the domain name in that URL on or very close to that date, to avoid problems when domain names change ownership. |
| @value | O | specifies the value for the descriptor element. The value space and semantics must be defined by the owners of the scheme identified in the @schemeIdUri attribute. |

Legend:
For attributes:
M = Mandatory,
O = Optional,
OD = Optional with Default Value,
CM = Conditionally Mandatory.
For elements: <minOccurs> . . . <maxOccurs> (N = unbounded)
Elements are bold;
attributes are non-bold and preceded with an @.

DASH may also support various forms of content protection. For example, segment(s) may be encrypted, and the MPD may comprise information which may be used by the client to decrypt and/or authenticate each segment prior to presentation to the user. DASH content protection is described further in Part 4. Common Encryption (CENC) standardizes which parts of an ISO-BMFF file may be encrypted using the standard Advanced Encryption Standard (AES) Counter Mode (AES-CTR) or Cipherblock Chaining (AES-CBC) modes, e.g., AES-128 CBC full-segment encryption mode, and how encryption metadata is signaled within a track. CENC is a content protection system that is responsible for delivering encryption/decryption keys to a client, given the encryption metadata in the file. The CENC framework is extensible and may use other encryption algorithms beyond these two, if defined. CENC is well known and presently used with several commercial Digital Rights Management (DRM) systems, such as Microsoft® PlayReady. CENC may also provide a mechanism to signal the CENC scheme and carry encryption key identifiers within a DASH ContentProtection descriptor. Specifically, the CENC scheme may be signaled by the content protection scheme identifier "mp4protection" for ISO Media files, and the identifiers of keys used to encrypt content segments associated with the ContentProtection descriptor may be provided using an attribute, "default_KID," whose value is a space-delimited list of different default_KID values.

The @ schemeIdUri attribute may be used by the element ContentProtection to identify a content protection scheme. As described in Part 1, the ContentProtection attribute may provide sufficient information, possibly in conjunction with the @value and/or extension attributes and elements, such as the DRM system(s), encryption algorithm(s), and key distribution scheme(s) employed, to enable a client to determine whether the client may play the protected content. The ContentProtection element may be extended in a separate namespace to provide information specific to the content protection scheme (e.g., particular key management systems or encryption methods). When the ContentProtection element is not present, the content may not be content-protected. When multiple ContentProtection elements are present, each element may describe a content protection scheme that is sufficient to access and present the Representation.

As Part 4 states, the application of the encryption format may be declared using the URN urn:mpeg:dash:sea:enc:2013 as the value for @schemeIdUri in a ContentProtection descriptor applicable to the encrypted segments. The ContentProtection descriptor may contain zero or more Cryptoperiod and/or Crypto Timeline elements. Each media segment may be associated with zero or one Cryptoperiod; segments that have no Cryptoperiod associated with them may not be encrypted. In a Cryptoperiod, segments may be encrypted with the same key/IV pair. The properties of a Cryptoperiod may include a key, an IV, first segment number, and last segment number. Note that ContentProtection descriptor may be defined in the namespace urn:mpeg:dash:schema:mpd:2011, as defined in Part 1, while SegmentEncryption, Cryptoperiod and CryptoTimeline may be defined in the namespace urn:mpeg:dash:schema:sea:2013. The semantics of the ContentProtection element may be as follows:

TABLE 2

| Element or Attribute Name | Use | Description |
|---|---|---|
| ContentProtection | | |
| @schemeIdUri | M | May be urn:mpeg:dash:sea:enc:2013. |
| sea:SegmentEncryption | 1 | May specify the encryption system used and its global properties. |
| sea:License | 0 . . . N | May specify the key system used and ways of getting license, if needed. |
| sea:Cryptoperiod | 0 . . . N | May specify information needed for derivation of key and IV information for a single Cryptoperiod. |
| sea:CryptoTimeline | 0 . . . N | May specify information needed for derivation of key and IV information for several constant-length Cryptoperiod. |

Legend:
For attributes:
M = Mandatory,
O = Optional,
OD = Optional with Default Value,
CM = Conditionally Mandatory.
For elements: <minOccurs> . . . <maxOccurs> (N = unbounded)
Elements are bold;
attributes are non-bold and preceded with an @.

The SegmentEncryption element may describe the global properties of segment encryption as used in all Cryptoperiods, and may have the semantics set forth in Part 4. The License element may describe the global properties of a key system used in all Cryptoperiods, and may have the semantics set forth in Part 4. The Cryptoperiod element may define a single Cryptoperiod, namely, it may provide information allowing derivation of an encryption key and an initialization vector, as well as identifying segments which were encrypted using the former two elements, and may have the semantics set forth in Part 4. A Cryptoperiod element may correspond uniquely to a start segment, and may have the semantics set forth in Part 4. The Cryptoperiod element may have explicitly specified duration (e.g., number of segments), or be unbounded (e.g., continue until the end of the current Period), and may have the semantics set forth in Part 4. The Crypto Timeline element may be used for derivation of multiple Cryptoperiods of constant length. While a single Cryptoperiod may correspond to a single Cryptoperiod, a single CryptoTimeline element may correspond to multiple Cryptoperiods.

The disclosure includes embodiments that may extend the existing signaling mechanisms, e.g., by adding fields for identifying an encryption algorithm, identifying an initialization vector size, identifying a content protection system underlying the key management system, and identifying a unique key identifier that can identify the key needed to decrypt the associated segments. Utilizing one or more disclosed embodiments may support decrypting transmissions having multiple encryption algorithms and/or mechanisms without the need to retrieve encrypted segments themselves. Using one or more of the disclosed embodiments may also support signaling content items (e.g., DASH segments, MPEG media transport (MMT) packages, MMT Assets, MMT Fragments, etc.) that are not wholly encrypted without considering their internal formats and structures, e.g., encrypted by CENC, and for specifying the related metadata, e.g., within the DASH MPD and/or MMT Composition Information and Transport Characteristics. The disclosed embodiments may extend the signaling mechanisms above by including a ContentProtection element having the following semantic characteristics:

TABLE 3

| Element or Attribute Name | Use | Description |
|---|---|---|
| ContentProtection | | |
| @schemeIdUri | 1 | May be urn:mpeg:dash:sea:2012. |
| @keyUrlTemplate | O | May specify the template for key URL generation, using same syntax and variable substitution as defined in Part 1. For a run of segments using the same @keyUrl, the value of $Number$ inserted may be the Number of the first segment of the associated Cryptoperiod. Note that use of @keyUrlTemplate does not imply use of @ivUrlTemplate or SegmentTemplate. |
| @ivUrlTemplate | O | May specify the template for IV URL generation using same syntax and variable substitution as defined in Part 1. For a run of segments using the same @IV or @ivUrl attribute, the value of $Number$ inserted may be the Number of the first segment of the associated Cryptoperiod Note that use of @ivUrlTemplate does not imply use of either @keyUrlTemplate or SegmentTemplate. |

TABLE 3-continued

| Element or Attribute Name | Use | Description |
| --- | --- | --- |
| @algorithm | M | May specify the algorithm used for segment encryption. Note: support for AES-128 in CBC mode may be mandatory. When used for CENC, URN's may be defined as urn:mpeg:dash:sea:cenc-X, where X is a representation of the value of the identifier IsEncrypted of the encryption state of the corresponding segments. For instance, urn:mpeg:dash:sea:cenc-1 may indicate segment encryption using AES 128-bit in CTR mode. |
| @IV_size | O | May specify the size of initialization vectors in bytes. For CENC, it can take the following values:<br>0 - Specifies 0-bit initialization vectors (not encrypted).<br>8 - Specifies 64-bit initialization vectors.<br>16 - Specifies 128-bit initialization vectors.<br>This attribute may be omitted when @algorithm has value urn:mpeg:dash:sea:cenc-0 (not encrypted). |
| @systemId | 0 . . . N | May specify a UUID-formatted opaque string for a system that can process and handle the content protection and rights management. When used for CENC, it may be the same as it appears in the 'pssh' box. |
| @systemProvider | 0 . . . N | May specify a location of a provider for a system that can process and handle the content protection and rights management. This may be in the form of an URL. |
| @keyAcquisitionUrlTemplate | O | May specify the URL template for key retrieval given a key identifier. In addition to regular DASH substitution variables, $KeyID$ substitution variable is defined as a 128-bit unsigned integer in zero-padded hexadecimal notation. Preferably, key acquisition may occur using HTTPS. The response may be a 16-byte binary coded number. |
| @licenseUrlTemplate | O | May specify the template for license URL generation, using same syntax and variable substitution as defined in Part 1. For a run of segments using the same @licenseUrl, the value of $Number$ inserted may be the Number of the first segment of the associated Cryptoperiod. Note that use of @licenseUrlTemplate does not imply use of @licenseUrlTemplate, @ivUrlTemplate or SegmentTemplate. |
| Cryptoperiod | 0 . . . N | May specify information and URLs needed for derivation of key and IV information for a single Cryptoperiod |
| CryptoTimeline | 0 . . . N | May specify information and URLs needed for derivation of key and IV information for several Cryptoperiods of the same length. |

Optionally, the @keyAcquisitionUrlTemplate field may be merged with @keyUrlTemplate by extending the latter with the variable $KeyID$ and adding the recommendation for the former.

The Cryptoperiod element may also be extended using the semantics below:

TABLE 4

| Element or Attribute Name | Use | Description |
| --- | --- | --- |
| Cryptoperiod | | May specify information and URLs needed for derivation of key information |
| @startSegment | O | May specify the number of the first Media Segment to which the key/IV information applies. If not specified, derivation rules specified in Part 4 apply. |
| @endSegment | O | May specify the number of the last Media Segment to which the key/IV information applies. If not specified, derivation rules specified in Part 4 apply. |
| @IV | O | May specify the initialization vector. It shall not be present if @ivUrl is present. IV derivation rules are specified in Part 4. |
| @keyUrl | O | May specify the URL for key derivation. @keyUrl shall not be present if @keyUrlTemplate is present in the ContentProtection element. Key derivation rules are specified in Part 4. |
| @ivUrl | O | May specify the URL for initialization vector derivation. @ivUrl shall be present only if @IV is not present, and shall not be present if @ivUrlTemplate is present in the ContentProtection element. IV derivation rules are specified in Part 4. |

TABLE 4-continued

| Element or Attribute Name | Use | Description |
|---|---|---|
| @IV_size | O | May specify the size of initialization vectors in bytes. For CENC, it can take the following values:<br>0 - Specifies 0-bit initialization vectors (not encrypted).<br>8 - Specifies 64-bit initialization vectors.<br>16 - Specifies 128-bit initialization vectors.<br>This attribute may be omitted when @algorithm has value urn:mpeg:dash:sea:cenc-0 (not encrypted). |
| @keyAcquisitionUrlTemplate | O | May specify the URL template for key retrieval given a key identifier. In addition to regular DASH substitution variables, $KeyID$ substitution variable may be defined as a 128-bit unsigned integer in zero-padded hexadecimal notation. Preferably, key acquisition would occur using HTTPS. The response may be a 16-byte binary coded number. |
| @licenseUrl | O | May specify the URL for license acquisition. The license format may be in some standard ones or be dependent on the system that is specified with @systemId. |

As would be understood by those of skill in the art, a Security Information Table as described in ISO/IEC DIS 23008-1, titled "High efficiency coding and media delivery in heterogeneous environments—Part 1: MPEG media transport (MMT)," incorporated herein by reference, may be modified to carry out the techniques described in this disclosure without undue experimentation, and therefore any such modifications are considered within the scope of this disclosure.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, ... 50 percent, 51 percent, 52 percent, ..., 95 percent, 96 percent, 97 percent, 98 percent, 99 percent, or 100 percent. Moreover, any numerical range defined by two R numbers as defined in the above is also specifically disclosed. The use of the term "about" means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. All documents described herein are incorporated herein by reference.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method comprising;
obtaining a media content comprising at least two segments, wherein each of the at least two segments are protected by one or more of at least two encryption schemes;
developing a manifest file that comprises a protection description for the media content, wherein the protection description comprises data sufficient to signal the encryption schemes for the at least two segments, wherein the data comprises:
an element that specifies an encryption scheme used for encryption of the segments; and
an initialization vector (iv) uniform resource identifier (URI) template that specifies a template for generating a URI pointing to an iv for the segments; and
transmitting the manifest file and the media content to a client.

2. The method of claim 1, wherein the protection description further comprises data sufficient to indicate to the client at least one of the following associated with the at least two encryption schemes: a key management system, iv information for a single period, and iv information for several constant-length periods.

3. The method of claim 1, wherein the protection description comprises data sufficient to signal a key URI associated with a period, wherein the key URI is usable to retrieve a key resource.

4. The method of claim 1, wherein the protection description comprises data describing global properties of protection schemes used in all periods for a media presentation.

5. The method of claim 1, wherein the protection description comprises data describing global properties of a key system used in all periods for a media presentation.

6. The method of claim 1, wherein at least a portion of the media content is encrypted using a common encryption algorithm.

7. The method of claim 1, wherein the manifest file is a media presentation description (MPD) file.

8. An apparatus comprising:
a memory;
a processor coupled to the memory and configured to:
   obtain a media content comprising at least two content items, wherein each of the at least two content items are protected by one or more of at least two encryption schemes, and wherein at least two of the encryption schemes for the at least two content items are different; and
   develop a manifest file that comprises a protection description for the media content, wherein the protection description comprises data sufficient to signal the encryption schemes for the at least two content items, wherein the data comprises an initialization vector (iv) uniform resource identifier (URI) template that specifies a template for generating a URI pointing to an iv for the content items; and
a transmitter coupled to the processor and configured to transmit the manifest file and the media content to a client.

9. The apparatus of claim 8, wherein at least a portion of the content items are obtained from a first source and at least a portion of the content items are obtained from a second source.

10. The apparatus of claim 8, wherein the protection description is transmitted using a Dynamic Adaptive Streaming over Hypertext Transfer Protocol (HTTP) (DASH) or Moving Picture Experts Group (MPEG) Media Transport (MMT) protocol.

11. The apparatus of claim 8, wherein the manifest file is a media apresentation description (MPD) file.

* * * * *